(12) United States Patent
Engels

(10) Patent No.: US 8,770,351 B2
(45) Date of Patent: Jul. 8, 2014

(54) DISC BRAKE DEVICE FOR RAIL VEHICLES

(75) Inventor: Gerhard Engels, Wuerselen (DE)

(73) Assignee: Siemens Aktiengesellschaft, Munich (DE)

( * ) Notice: Subject to any disclaimer, the term of this patent is extended or adjusted under 35 U.S.C. 154(b) by 71 days.

(21) Appl. No.: 13/505,000

(22) PCT Filed: Oct. 27, 2010

(86) PCT No.: PCT/EP2010/066270
§ 371 (c)(1),
(2), (4) Date: Apr. 30, 2012

(87) PCT Pub. No.: WO2011/051347
PCT Pub. Date: May 5, 2011

(65) Prior Publication Data
US 2012/0211312 A1    Aug. 23, 2012

(30) Foreign Application Priority Data

Oct. 30, 2009 (DE) .......................... 10 2009 051 352

(51) Int. Cl.
*F16D 66/02* (2006.01)
(52) U.S. Cl.
USPC .................. 188/1.11 L; 188/1.11 E; 303/112
(58) Field of Classification Search
USPC ..... 188/1.11 L, 1.11 E, 1.11 R, 1.11 W, 71.1, 188/73.41–73.45, 181 T; 303/112
See application file for complete search history.

(56) References Cited

U.S. PATENT DOCUMENTS

| | | | | |
|---|---|---|---|---|
| 4,679,668 A | * | 7/1987 | Washizu et al. | 188/353 |
| 4,716,994 A | * | 1/1988 | Iwamoto | 188/72.2 |
| 5,279,394 A | * | 1/1994 | Wollenweber et al. | 188/1.11 E |
| 6,059,379 A | * | 5/2000 | Deml et al. | 303/15 |
| 6,957,571 B2 | | 10/2005 | Staltmeir et al. | |
| 7,331,427 B2 | * | 2/2008 | Mohr | 188/1.11 E |
| 2004/0069055 A1 | | 4/2004 | Staltmeir et al. | |

FOREIGN PATENT DOCUMENTS

| | | |
|---|---|---|
| DE | 1 951 104 U | 12/1966 |
| DE | 44 25 598 C1 | 12/1995 |
| DE | 196 10 664 C2 | 2/1998 |
| DE | 101 06 378 C2 | 3/2003 |
| DE | 198 57 092 B4 | 3/2006 |
| DE | 10 2008 015 873 A1 | 10/2009 |
| EP | 0 794 102 A1 | 9/1997 |
| EP | 1 640 233 A1 | 3/2006 |
| WO | 2009/118350 A2 | 10/2009 |

OTHER PUBLICATIONS

English Translation of German Patent No. DE19857092, Espacenet, Mar. 2, 2006.*
English Translation of German Patent No. DE4425598, Espacenet, Dec. 21, 1995.*

* cited by examiner

*Primary Examiner* — Pamela Rodriguez
(74) *Attorney, Agent, or Firm* — Laurence A. Greenberg; Werner H. Stemer; Ralph E. Locher

(57) ABSTRACT

A disk brake device for rail vehicles includes a brake disk for attachment to a chassis and a brake assembly for providing a braking force. The brake assembly has a brake cylinder and a brake caliper that carries a brake pad for cooperating with the brake disk. A sensor is provided on a force transmission path from the brake cylinder to the brake pad. The sensor is configured and arranged to detect a force transfer to the brake disk.

6 Claims, 3 Drawing Sheets

DISC BRAKE DEVICE FOR RAIL VEHICLES

BACKGROUND OF THE INVENTION

Field of the Invention

The invention relates to a disc brake device for rail vehicles, having a brake disc for attachment to a chassis and a brake arrangement for providing braking force, which comprises a brake cylinder and a brake caliper, which carries a brake lining to cooperate with the brake disc.

Proper functioning of such a disc brake device for rail vehicles is of fundamental significance for their reliable operation, for this reason, measures are taken, independently of a triggering of a braking procedure, to check an actual provision of braking force.

This is performed in such a manner that the brake pressure present at the brake cylinder is detected and analyzed. In this procedure, it is not taken into consideration that a braking force exerted by the brake cylinder is possibly not transmitted for some reason to the brake disc, because the force path from the brake cylinder to the brake disc is not considered to be faulty in the first place.

This is to be considered disadvantageous in that it cannot be reliably presumed that a brake force provided by the brake cylinder would be transmitted under all circumstances to the brake disc.

BRIEF SUMMARY OF THE INVENTION

Proceeding therefrom, the invention is based on the object of refining a disc brake device of the type mentioned at the beginning in such a manner that an actual transmission of braking force to the brake disc can be established with higher reliability.

This object is achieved in the disc brake device of the type mentioned at the beginning in such a manner that a sensor is provided on a force transmission path from the brake cylinder to the brake lining, which is implemented and arranged to detect a force transmission to the brake disc.

Such a procedure allows an actual force transmission to the brake disc to be established with higher reliability. Because of the contact of the brake lining on the brake disc, feedback occurs on the force transmission path between the brake cylinder and the brake lining, which can be detected with the aid of the provided sensor.

The brake lining is preferably attached via a joint to the brake caliper and the sensor is arranged in the area of the joint. It is obvious that a contact of the brake lining on the brake disc has the result that the forces in the joint change. This procedure is utilized to establish whether a brake force is actually exerted on the brake disc.

The joint can preferably be implemented as a pin/bush combination, wherein the sensor can be integrated in the bush. A contact of the brake lining on the brake disc causes, for example, the pin to be pressed with higher force against the inner side of the bush. This force can be detected with the aid of the sensor, which is preferably provided as a piezoelement.

The sensor is advantageously implemented to output an electrical signal, which reflects reaching a predefined minimum force transmission between the brake lining and the brake disc. Such an electrical signal can be supplied, for example, to a brake control device (BCD) provided on the rail vehicle, which analyzes this signal, which is therefore used as an unambiguous indicator for the braking force present between brake caliper and brake disc.

In addition to the sensor for establishing a brake force present between brake lining and brake disc, an inductive proximity switch can be provided for detecting an approach of a brake lining holder to the brake disc. An additional safeguard with regard to a brake force transmission results in this manner.

The proximity switch can preferably be integrated in an edge area of the brake lining holder, for example, in the upper area of the brake lining holder in the installed location of the disc brake device. A use of special brake linings is not necessary due to the installation of the proximity switch at this point.

The proximity switch can be designed for signaling a brake lining loss and/or reaching a wear limit for the brake lining. In this way, the proximity switch can execute a switching procedure at a defined distance to the brake disc. The acquired information can then be displayed via the operative path to a rail vehicle driver. For display purposes, it is also possible that an indicator light is used.

The provided disc brake device allows the application of the brake force to be detected directly at a point relevant for this purpose. A possible problem with respect to the transmission of brake force to the brake disc is thus recognized in a timely manner and can be transmitted via a brake control device to the vehicle controller and finally to the rail vehicle driver. The driver is therefore made capable of stopping the train safely through a corresponding operating procedure, for example, actuating of the magnetic disc brake and/or eddy current brake.

An exemplary embodiment of the invention will be explained in greater detail hereafter with reference to the drawings. In the figures:

DESCRIPTION OF THE INVENTION

Figure 1:
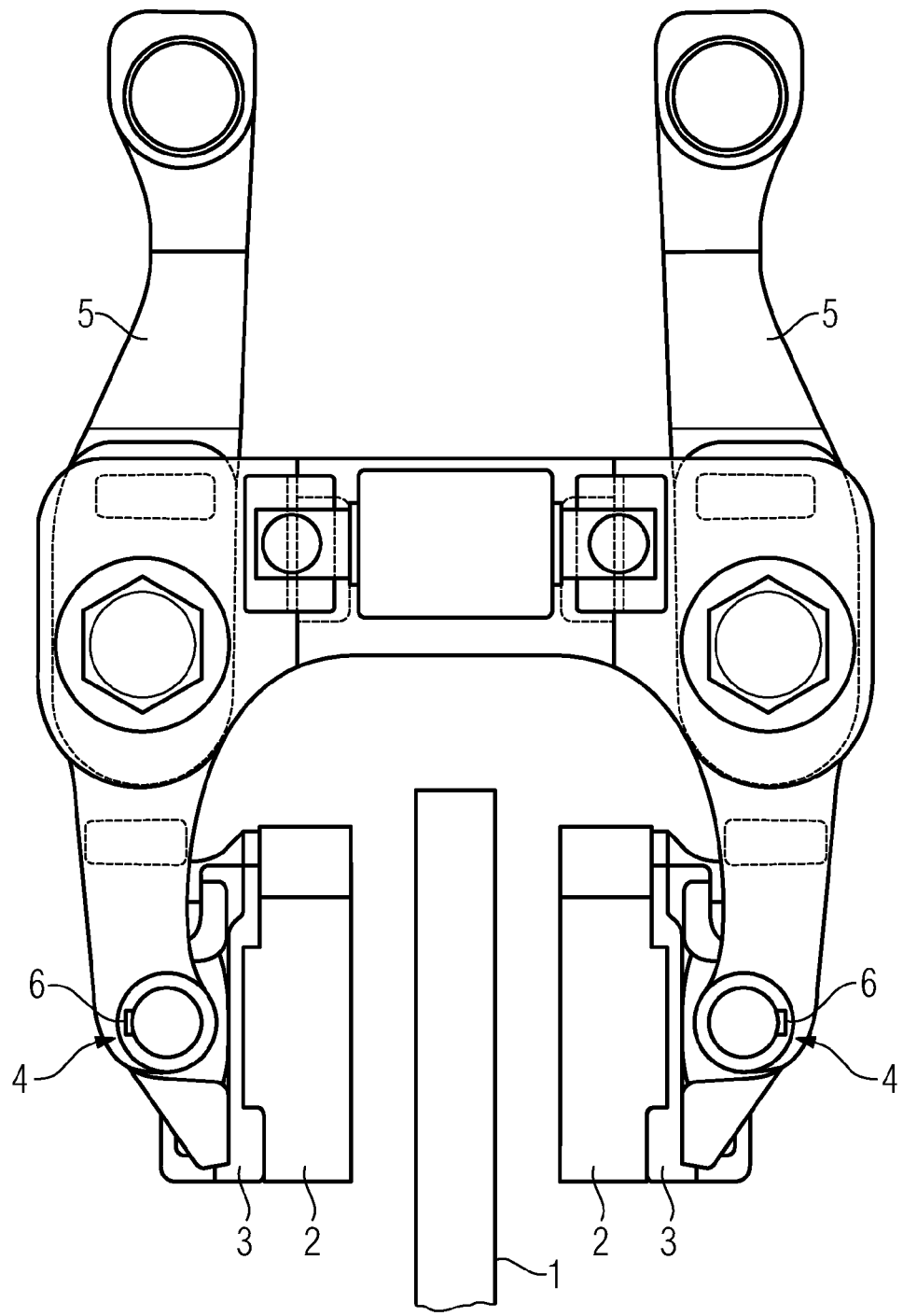
FIG. 1 shows a top view (view from above) of a disc brake device for a rail vehicle.

The general construction of a disc brake device for a rail vehicle is shown in FIG. 1. A disc brake 1 cooperates with two brake linings 2, which are in turn arranged on brake lining holders 3. The brake lining holders 3 are each attached via a bush bearing 4 on the associated end of a brake caliper 5. As known in the prior art, the disc brake device is implemented as symmetrical with respect to the brake disc 1.

Through suitable actuation of the free ends of the brake calipers 5 in FIG. 1 via a brake cylinder (not shown here), the brake linings 2 are moved in the direction toward the brake disc 1, so that a braking procedure can be performed.

The force path for moving the brake linings 2 in the direction toward the brake disc 1 therefore leads from the free ends of the brake calipers 5 via the bush joints 4 and the brake lining holder 3 to the brake lining 2 itself.

A piezoelement 6 is integrated in the bush bearing 4 shown on the left in FIG. 1, specifically in an inner surface of the bush in relation to the associated brake lining 2. As soon as the brake lining 2 comes into contact with the disc brake 1, a force is introduced into the bush bearing 4, which results in compression of the piezoelement 6. The piezoelement 6 then generates an electrical signal, which can be supplied to a brake control unit of the rail vehicle. A minimal threshold value can be established for the force detected by the piezoelement 6, the exceeding of which is evaluated as an indication that the brake is functioning.

Figure 2:
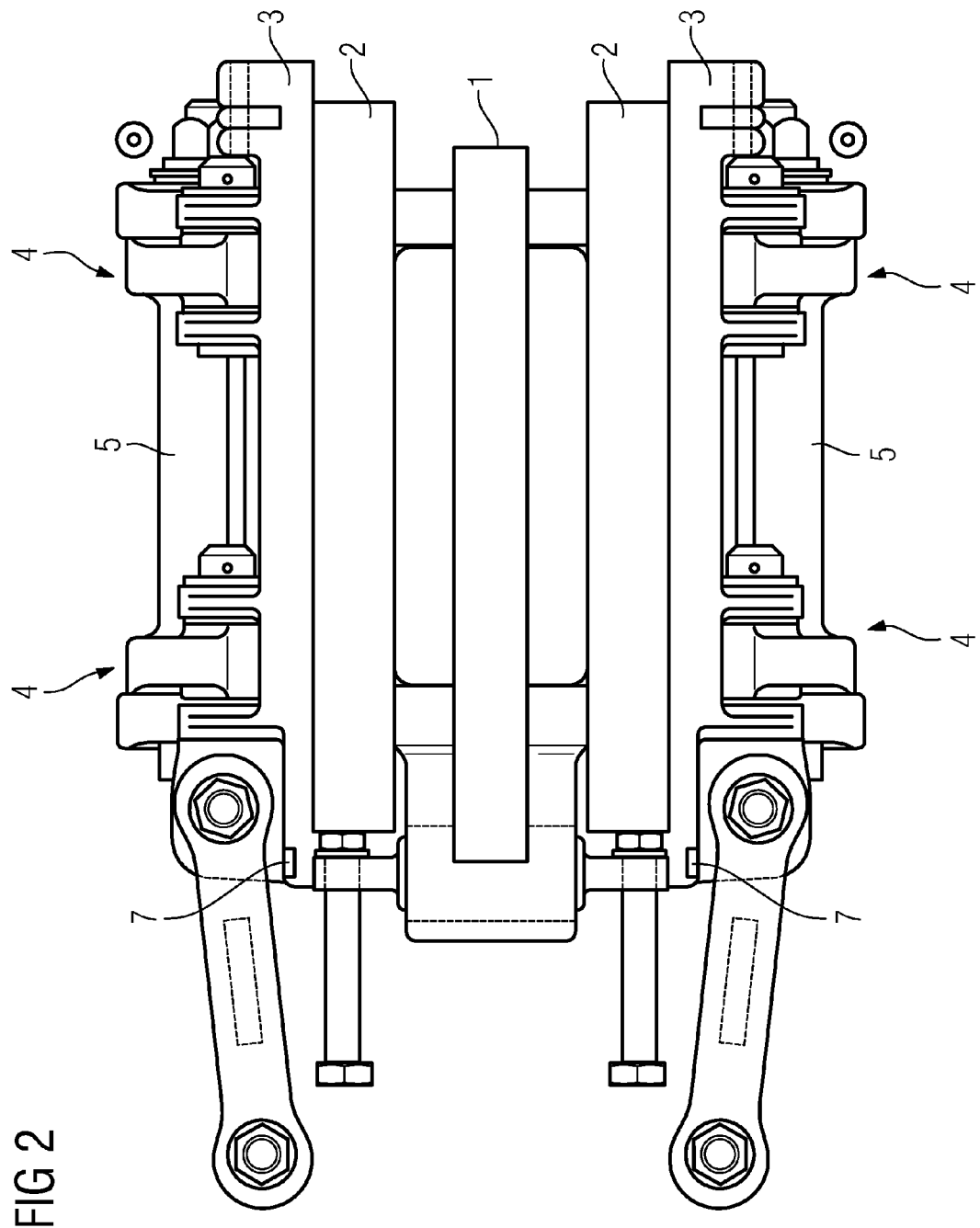
FIG. 2 shows a front view (view from the front) of the disc brake device of FIG. 1.

The function of the piezoelement 6, which detects the application of brake force to the brake disc 1 very directly, is assisted by inductive proximity switches 7, the arrangement of which is shown in FIG. 2, for example. In the installed location of the disc brake device, the inductive proximity switches 7 are located in the upper part of the brake lining holder 3. Switching of the proximity switches 7 occurs if, for example, the brake lining 2 falls below a predefined minimum thickness or is absent.

Figure 3:
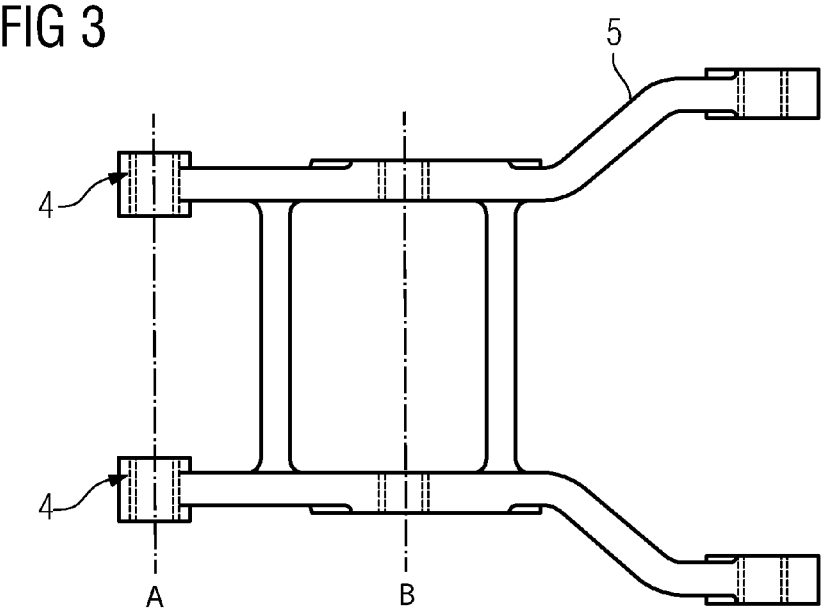
FIG. 3 shows a side view of a brake caliper of the disc brake device of FIG. 1.
Figure 4:
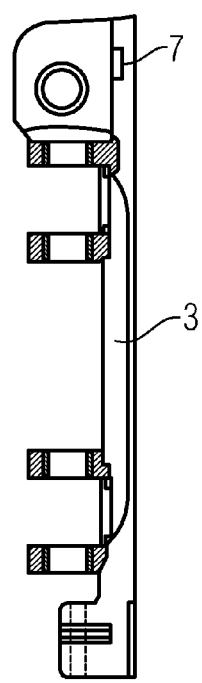
FIG. 4 shows a sectional view of a brake lining holder of the disc brake device of FIG. 1.
Figure 5:
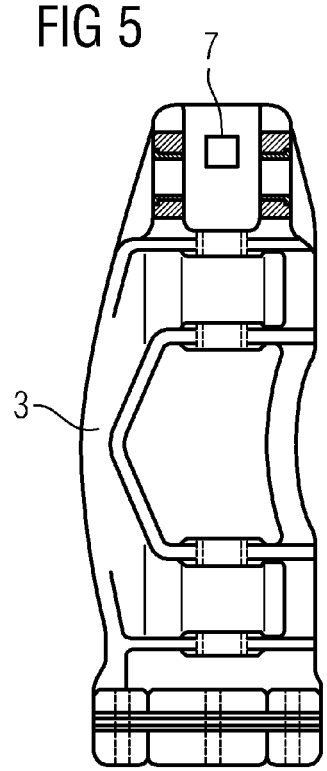
FIG. 5 shows a view from the front of the brake lining holder of FIG. 4.

The precise location of the piezoelement 6 is shown in still greater detail in FIG. 3, which exclusively shows one of the brake calipers 5. The piezoelement 6 is located at the level of a bearing axis A for the brake lining holder 3. The brake caliper 5 itself is pivoted around an axis B during the braking procedure. FIGS. 4 and 5 show the arrangement of the inductive proximity switches 7 in greater detail, namely in the upper area of the brake lining holder 3.

The invention claimed is:

1. A disc brake device for a rail vehicle, the device comprising:
    a brake disc for attachment to a chassis of the rail vehicle;
    a brake arrangement for providing a braking force, said brake arrangement including a brake cylinder and a brake caliper carrying a brake lining disposed to cooperate with said brake disc;
    a sensor configured to detect a force transmission to said brake disc and disposed on a force transmission path from said brake cylinder to said brake lining;
    said brake lining being attached via a joint to said brake caliper and said sensor being arranged in an area of said joint, said joint being a combination of a pin and a bush and said sensor being integrated in said bush.

2. The disc brake device according to claim 1, wherein said sensor is a piezoelement.

3. The disc brake device according to claim 1, wherein said sensor is configured to output an electrical signal, the electrical signal indicating when a predefined minimum force transmission between said brake lining and said brake disc has been reached.

4. The disc brake device according to claim 1, wherein said brake lining is held by a brake lining holder and each said brake line holder is provided with an inductive proximity switch for detecting an approach of said brake lining holder to said brake disc.

5. The disc brake device according to claim 4, wherein said proximity switch is integrated in an edge area of said brake lining holder.

6. The disc brake device according to claim 4, wherein said proximity switch is configured for signaling a brake lining loss and/or when a wear limit for the brake lining is reached.

* * * * *